April 13, 1965  A. W. ANDERSEN  3,177,523
HOLDER FOR FISH AND FISHING POLES
Filed July 2, 1962  3 Sheets-Sheet 1
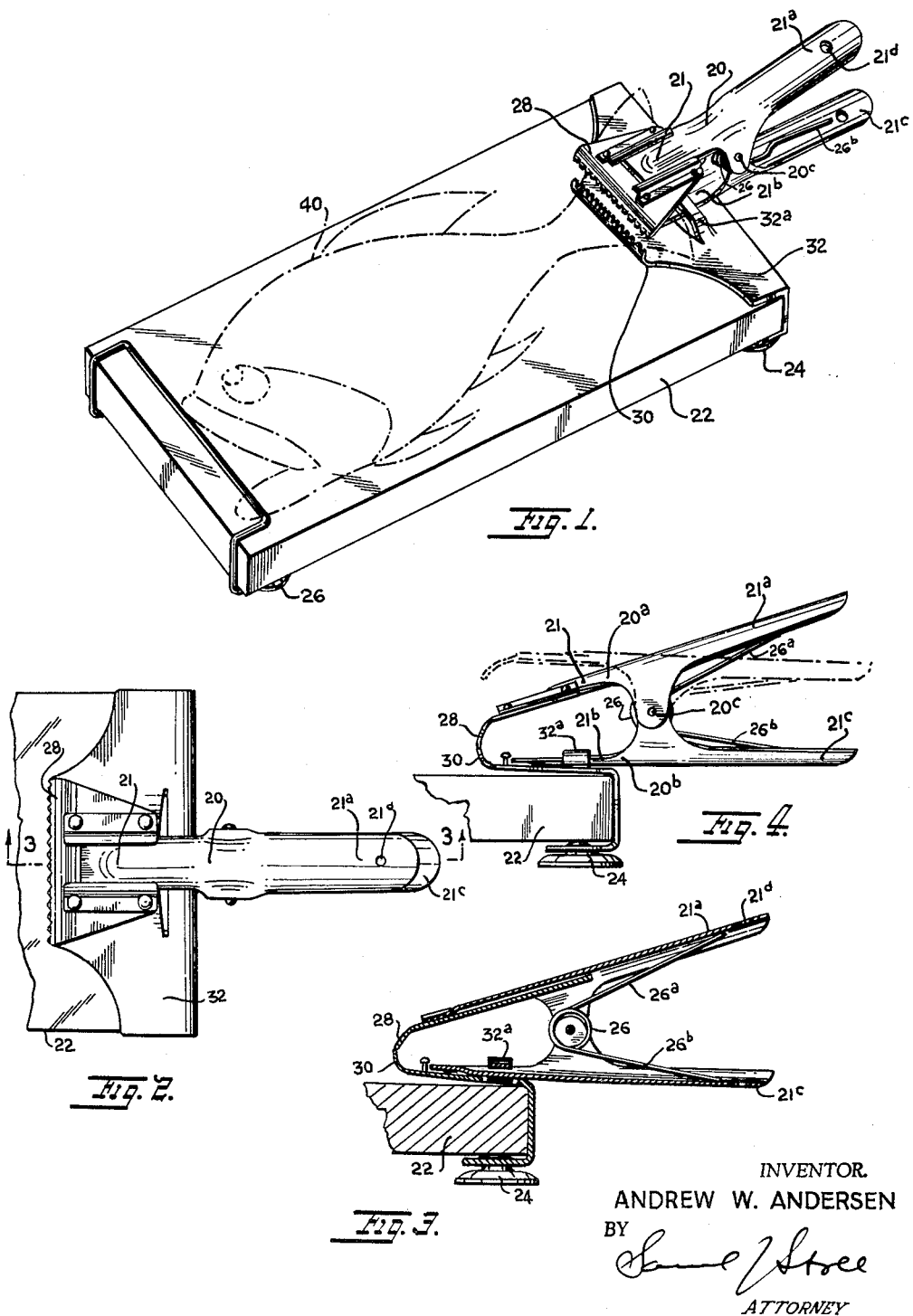
INVENTOR.
ANDREW W. ANDERSEN
BY
ATTORNEY April 13, 1965 A. W. ANDERSEN 3,177,523
HOLDER FOR FISH AND FISHING POLES
Filed July 2, 1962 3 Sheets-Sheet 2

INVENTOR.
ANDREW W. ANDERSEN
BY
*Paul J. Stree*
ATTORNEY

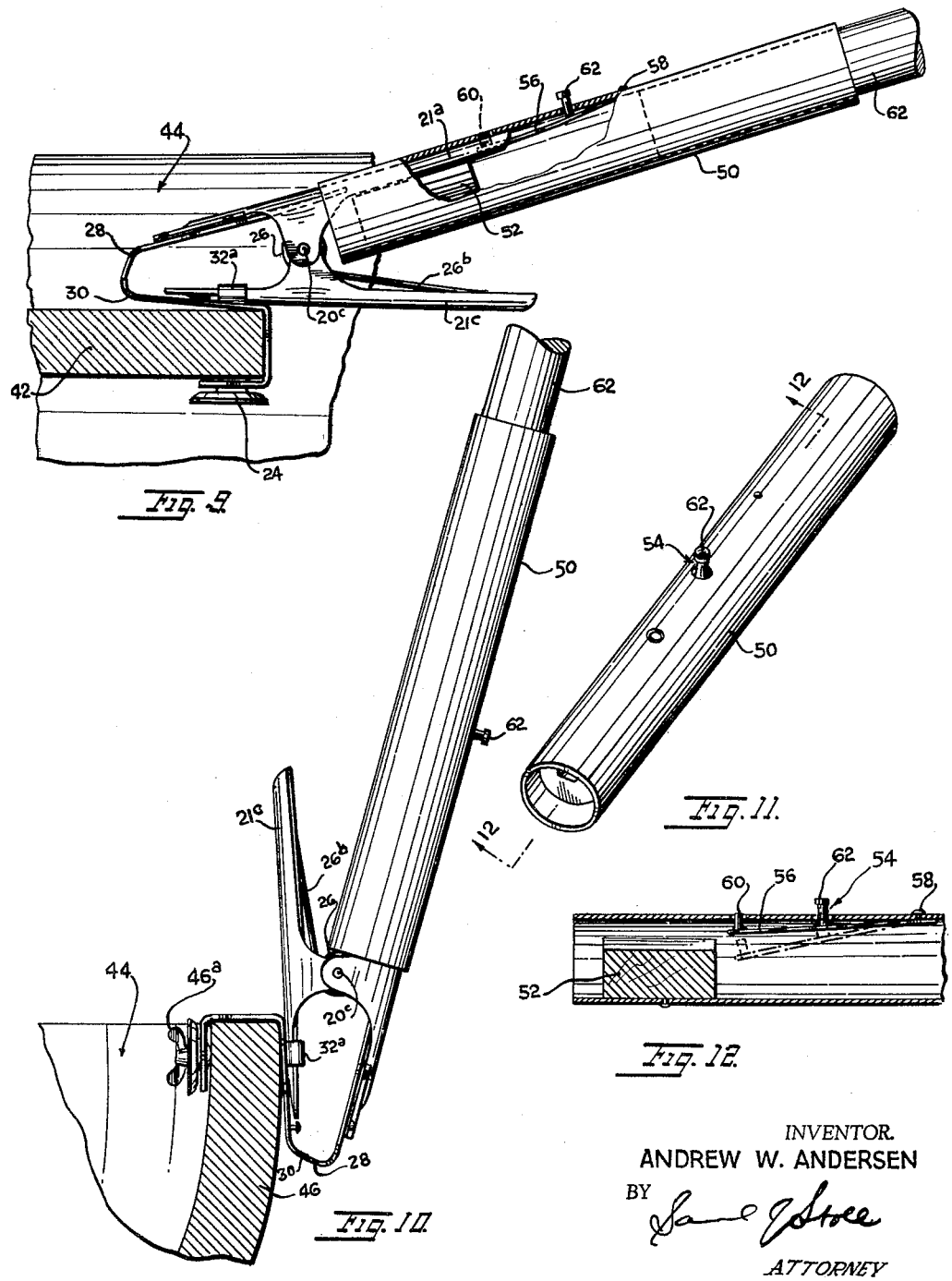

United States Patent Office 3,177,523
Patented Apr. 13, 1965.

3,177,523
HOLDER FOR FISH AND FISHING POLES
Andrew W. Andersen, 183 Parkwood Road,
Babylon, N.Y.
Filed July 2, 1962, Ser. No. 206,655
4 Claims. (Cl. 17—8)

This invention relates to new and useful improvements in a holder for fish and fishing poles or rods.

The essential object of the invention is the provision of means for assisting fishermen in connection with their fishing and fish cleaning activities.

Referring to the fish cleaning activities, it is the object of this invention to provide a handy and convenient clamping device for holding a fish in place for cleaning and scaling purposes. Basically, the device comprises a board adapted to support a fish, suction means on said board to anchor it to a suitable support such as the deck floor boards or benches of a boat, and clamping means on said board for securing the fish thereto. Once a fish is held in place by means of this device the fisherman's hands are free to perform the usual cleaning and scaling operations. This is not only a matter of convenience, but also helps prevent injury to the fisherman by reason of the slipping of his knife during the operation.

An important feature of the invention is the fact that its clamping means may be utilized without the board and its suction supports. The clamping means may be applied directly to the conventional wooden cross benches of small boats such as rowboats and the like. The bench would thereby perform the function of the board to support the fish during the cleaning operation.

Regarding the fish pole holding function of the present device, use is made of the clamping means and a fish pole holder associated therewith. The clamping means may be used for securing the device to any suitable support such as the gunwales or cross benches of a boat. By the same token, the clamping means may be mounted on the very same board previously mentioned in connection with the cleaning function of the present invention. In either case, the clamping means is held in place on a firm support. Associated with said clamping means is a tubular holder which is adapted to receive the butt end or handle of a fishing pole or rod. This would free the fisherman's hands during the intervals between bites and thereby make fishing a more enjoyable and restful avocation.

The invention is illustrated in the accompanying drawing in which:

FIGURE 1 is a perspective view of the present device as used for fish cleaning purposes and showing the clamp means mounted on a board.

FIGURE 2 is a fragmentary top view showing said clamp means and a portion of the board.

FIGURE 3 is a sectional view on the line 3—3 of FIGURE 2.

FIGURE 4 is a side view of said clamping means mounted on said board.

FIGURE 9 is a view of said clamping means mounted on a cross bench of a boat and supporting a fishing rod.

FIGURE 10 is a view of said clamping means mounted on the gunwale or side of a boat and also showing it supporting a fishing rod.

FIGURE 11 is a perspective view of the holder element which is adapted to receive the fishing rod.

FIGURE 12 is a fragmentary longitudinal view on the line 12—12 of FIGURE 11.

Figure 5:
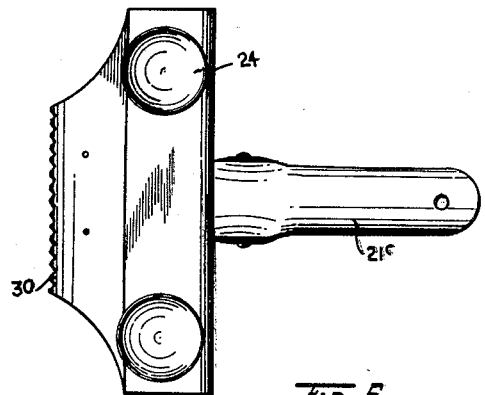
FIGURE 5 is a bottom view of the clamping means.
Figure 6:
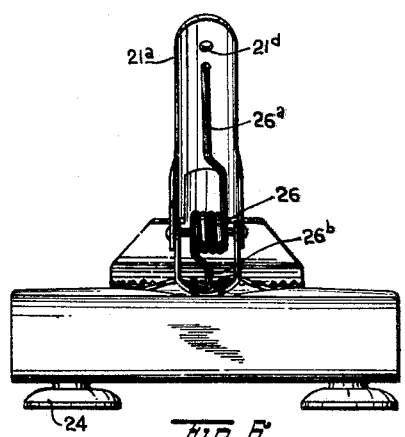
FIGURE 6 is an end view thereof.
Figure 8:
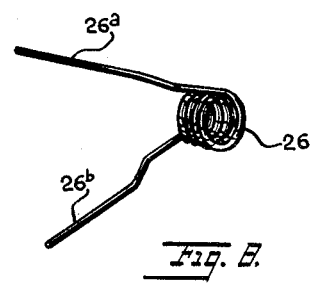
FIGURE 8 is a perspective view of the torsion spring of said clamping means.
Figure 7:
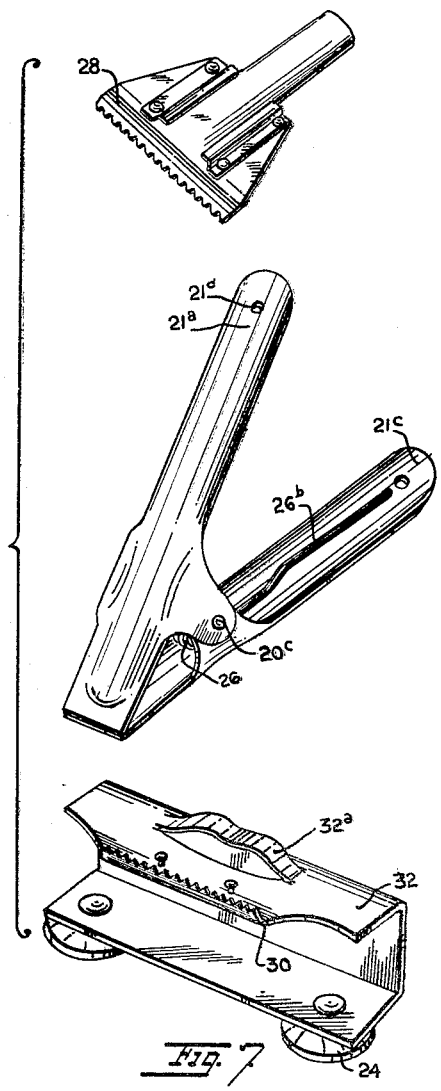
FIGURE 7 is an exploded perspective view of the several components of said clamping means.

The first form of the invention is shown in FIGURES 1 to 4 inclusive and it will be noted that it comprises clamp means 20 mounted on a board 22, suction means 24 on said clamp means and additional suction means 26 on said board, both groups of suction means being adapted to support the board on a suitable support such as the deck or floor boards or bench of a boat. However, the invention is not limited to its application to boats and it will, of course, be understood that the same device may be used on shore or on a fishing pier or the like.

Clamping means 20 comprises a pair of pivotally connected elements 20a and 20b, respectively, said elements being mounted on a common pin 20c which carries a torsion spring 26. Pivotally connected element 20a has a tongue portion 21 and a handle portion 21a. Pivotally connected element 20b also has a tongue 21b and a handle portion 21c. The two arms 26a and 26b of torsion spring 26 engage the facing sides of the two handle portions 21a and 21c and urge their respective tongue portions toward each other.

The clamp means is also provided with a pair of jaws 28 and 30, respectively, these jaws being toothed or serrated and being adapted to engage and cooperate with each other to clamp a fish tail or the like between them. This is accomplished in the following manner: It will be observed that the upper clamping jaw 28 is slidably connected to tongue 21 of the upper pivotally connected element 20. It will also be observed that the lower clamping jaw 30 is connected to and forms part of a U-shaped bracket 32. A loop 32a is formed on said U-shaped bracket 32 and it will be seen that tongue 21b of the lower pivotally connected element 20b is slidably connected to the U-shaped bracket 32 by means of said loop 32a. Since the upper tongue 21 is connected to the upper jaw element 28 and the lower tongue is connected to the lower jaw element 30, it will be apparent that the action of spring 26 on handles 21a and 21c is to force the two jaw elements toward each other and into clamping engagement with whatever object is placed between them.

It will be observed in FIGURE 1 that the clamping jaws may be used to clamp a fish 40 between them. This is one of the principal functions of the clamping means. However, it will be understood that said clamping jaws may be applied to a cross bench or gunwale of a boat or any other support in order to secure the clamp thereto. This would be in connection with the second function of the present invention, namely, to support a fishing pole or rod as shown, for example, in FIGURES 9 and 10.

Referring to said FIGURES 9 and 10, it will be observed that the U-shaped bracket 32 of the clamping means may be placed upon a cross bench 42 of a rowboat 44 or upon the side or gunwale 46 of said rowboat. When this is done, it may be found desirable to utilize a thumbscrew to secure said U-shaped bracket to its support. The bench or seat 42, as shown in FIGURE 9, is essentially a horizontal support and the upper pivotally connected elements 20 of the clamping means is thereby supported at an angle of approximately 20 degrees to the horizontal. Should it be desired to mount the clamp so that its upper pivotally connected element 20 is supported at a relatively more vertical angle, this can be done by mounting the clamp on the side or gunwale of the boat, which is essentially a vertically positioned member. As indicated in FIGURE 10, the upper pivotally connected element 20 may thereby be supported at an angle of approximately 75 degrees relative to the horizontal. These angular positions are not critical and they depend on the angular position of the supporting member on which the U-shaped bracket is mounted.

Holder 50 is a tubular member which is adapted to slip over the handle portion 21a of the upper pivotally connected element 20 of the clamping means. A block 52 within said tubular element 50 engages said handle 21a and firmly secures said tubular element to said handle. Latching means 54 are provided on the tubular member 50 and it will be noted that said latching means comprise a spring element 56 which is secured at one end to the tubular element 50 by means of rivet 58 and which is provided at its free end with a pin 60. Intermediate its two ends is a button 62 by which the spring element and its pin 60 may be moved from their solid line to dotted line positions, illustrated in FIGURE 12. Handle 21a is provided with a hole 21d which is adapted to receive said pin 60 in order to lock said tubular holder 50 to the clamping means. When it is desired to release the tubular holder from said clamped means, button 62 is pressed, and the pin is thereby caused to disengage hole 21d to free the tubular holder from the clamping means.

As has above been indicated, the clamping means may assume different positions relative to the horizontal, depending on the support to which said clamping means may be attached. This would, of course, also apply to the tubular holder 50 when said tubular holder is mounted on the clamping means. A fishing rod or pole 62 may be inserted into said tubular holder, as shown in FIGURES 9 and 10, and the fishing rod will thereby be supported at either of the two angles above mentioned, with respect to the horizontal. In FIGURE 9, the fishing rod is supported in a slightly inclined position, not too far removed from the horizontal. In FIGURE 10, it is supported at virtually a vertical position, inclined but slightly from the vertical.

The foregoing is illustrative of a preferred form of this invention and it will be appreciated that variations and modifications in design may be incorporated therein within the broad principles of the invention and the broad scope of the claims.

What is claimed is:

1. A device of the character described, comprising a horizontal board, suction mounting means on said board for mounting the board in a substantially horizontal position, clamp mounting means comprising a U-shaped bracket which is adapted to receive said board, a mounting loop on said U-shaped bracket, said U-shaped bracket having a lower toothed jaw element connected thereto, a pair of pivotally connected handle portions, one of said handle portions being in engagement with said mounting loop, the other of said handle portions having an upper toothed jaw element mounted thereon, spring means urging said handle portions away from one another and said upper and lower toothed jaw elements toward one another to cause said upper and lower toothed jaw elements to engage one another in clamping relationship.

2. A device of the character described in accordance with claim 1, wherein said upper toothed jaw element is slidably mounted on said other of said handle portions.

3. A device of the character described in accordance with claim 1, wherein said lower toothed jaw element is formed integrally with said U-shaped bracket.

4. A device of the character described in accordance with claim 3, wherein said other of said handle portions has a tubular member connected thereto, said tubular member being adapted to receive a fishing pole in supporting relationship.

References Cited by the Examiner
UNITED STATES PATENTS

| | | | |
|---|---|---|---|
| 2,300,321 | 10/42 | Swezey | 17—8 |
| 2,686,334 | 8/54 | Miller | 17—8 |
| 2,980,948 | 4/61 | McCain | 17—8 |

SAMUEL KOREN, *Primary Examiner.*

LUCIE H. LAUDENSLAGER, *Examiner.*